United States Patent
Thomson et al.

(10) Patent No.: US 8,196,845 B2
(45) Date of Patent: Jun. 12, 2012

(54) FLEXURE SEAL FOR FUEL INJECTION NOZZLE

(75) Inventors: Neal A. Thomson, West Des Moines, IA (US); Troy Hall, Prole, IA (US); Daniel T. Haggerty, Clive, IA (US); Mark Alan Caples, Ankeny, IA (US)

(73) Assignee: Delavan Inc, West Des Moines, IA (US)

( * ) Notice: Subject to any disclaimer, the term of this patent is extended or adjusted under 35 U.S.C. 154(b) by 98 days.

(21) Appl. No.: 12/846,683

(22) Filed: Jul. 29, 2010

(65) Prior Publication Data

US 2010/0307161 A1 Dec. 9, 2010

Related U.S. Application Data

(63) Continuation-in-part of application No. 12/212,272, filed on Sep. 17, 2008, now abandoned.

(60) Provisional application No. 60/994,053, filed on Sep. 17, 2007.

(51) Int. Cl.
*B05B 1/24* (2006.01)
(52) U.S. Cl. .............. 239/132; 239/132.3; 239/397.5; 239/403; 239/405; 239/DIG. 4
(58) Field of Classification Search .............. 239/128, 239/132, 132.3, 397.5, 403, 405, DIG. 4; 60/740
See application file for complete search history.

(56) References Cited

U.S. PATENT DOCUMENTS

| | | | |
|---|---|---|---|
| 4,962,889 A | 10/1990 | Halvorsen | |
| 5,269,468 A * | 12/1993 | Adiutori | 239/397.5 |
| 5,605,287 A | 2/1997 | Mains | |
| 5,761,907 A | 6/1998 | Pelletier et al. | |
| 6,149,075 A | 11/2000 | Moertle et al. | |
| 6,276,141 B1 | 8/2001 | Pelletier | |
| 6,688,534 B2 * | 2/2004 | Bretz | 239/403 |
| 2002/0134084 A1 | 9/2002 | Mansour et al. | |
| 2010/0251720 A1 | 10/2010 | Pelletier et al. | |

FOREIGN PATENT DOCUMENTS

| | | |
|---|---|---|
| EP | 1811229 A2 | 7/2007 |
| EP | 1918548 A2 | 5/2008 |

OTHER PUBLICATIONS

International Search Report for PCT/US2008/076610 dated Feb. 11, 2010.
Written Opinion of the International Searching Authority for PCT/US2008/076610 dated Feb. 11, 2010.

* cited by examiner

*Primary Examiner* — Steven J Ganey
(74) *Attorney, Agent, or Firm* — Edwards Wildman Palmer LLP; Scott D. Wofsy

(57) ABSTRACT

A nozzle includes an inlet at an upstream end of the nozzle, a discharge outlet at a downstream end of the nozzle, and a fluid delivery passage extending between the inlet and the discharge outlet. Exterior and interior walls of the nozzle have downstream tip ends that are relatively longitudinally movable at one or more interfaces. An internal insulating gap is interposed between the interior and exterior walls to insulate fuel from ambient temperature conditions exterior to the nozzle. One or more flexible seal structures internal to the nozzle isolate a portion of the insulating gap from any ambient fluid entering into the gap through the one or more interfaces while providing relative movement between interior and exterior walls of the nozzle.

16 Claims, 6 Drawing Sheets

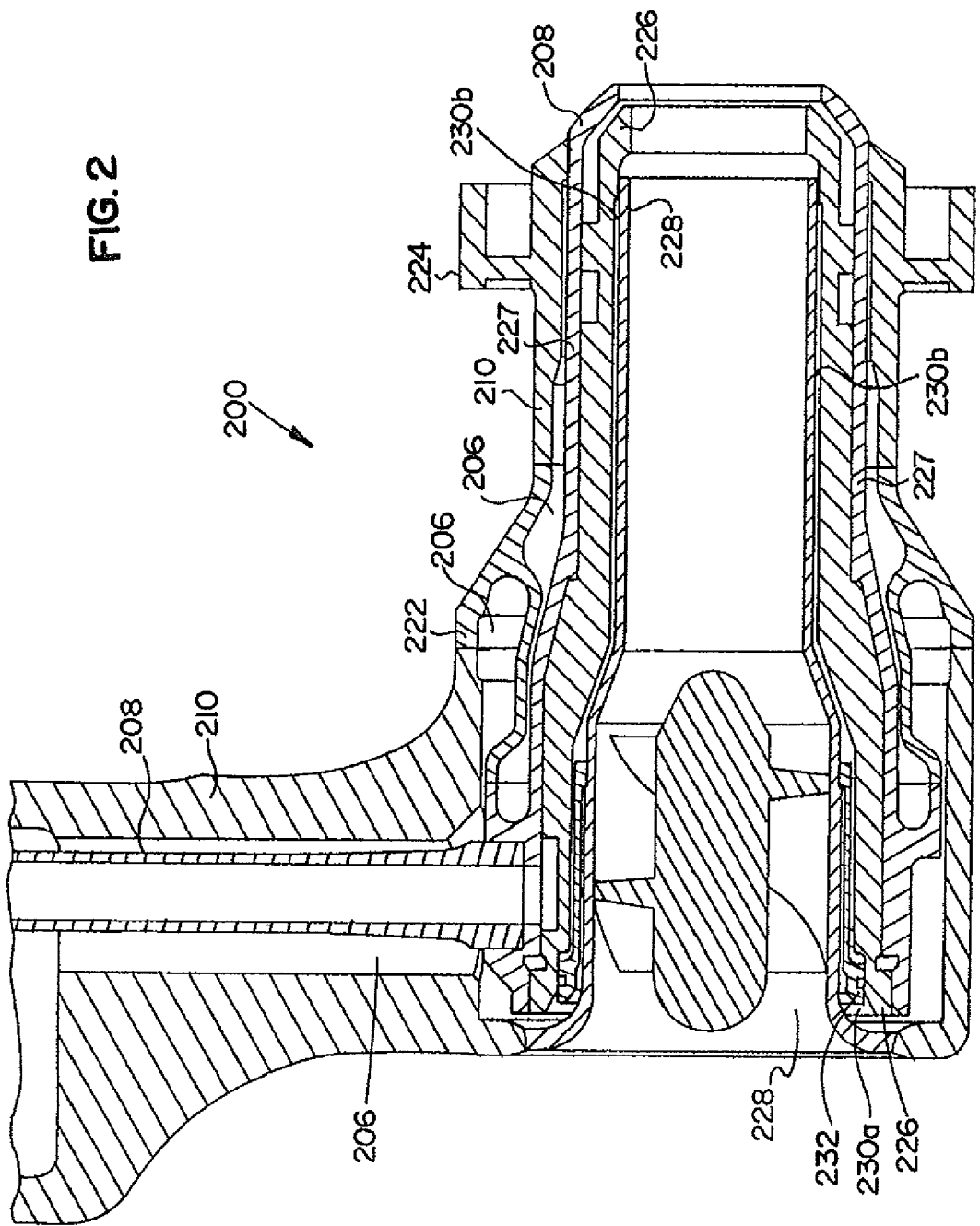

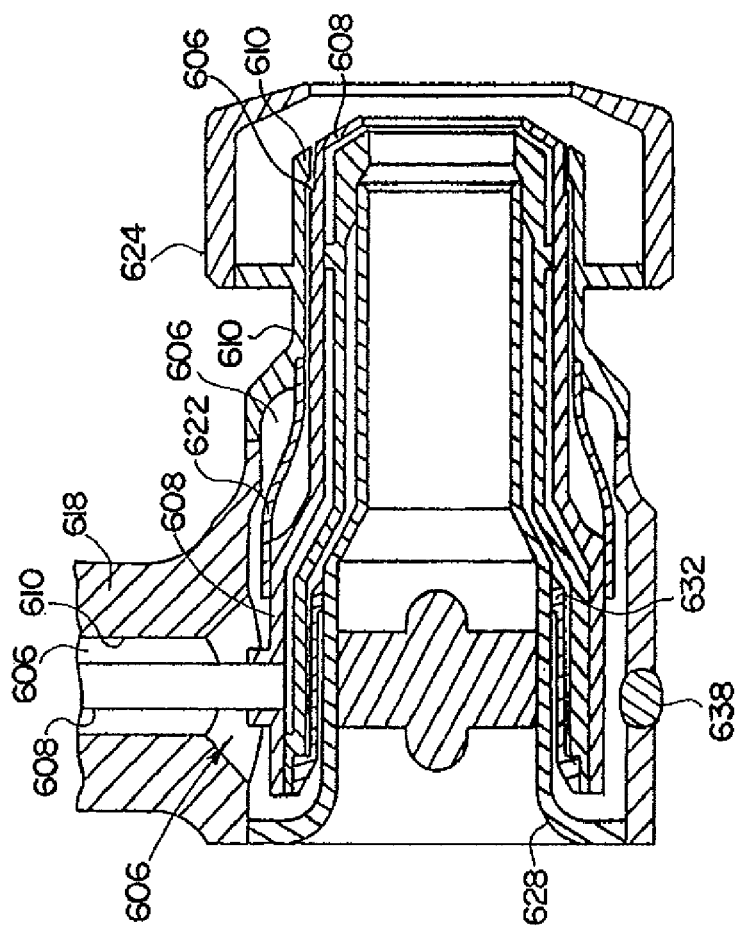
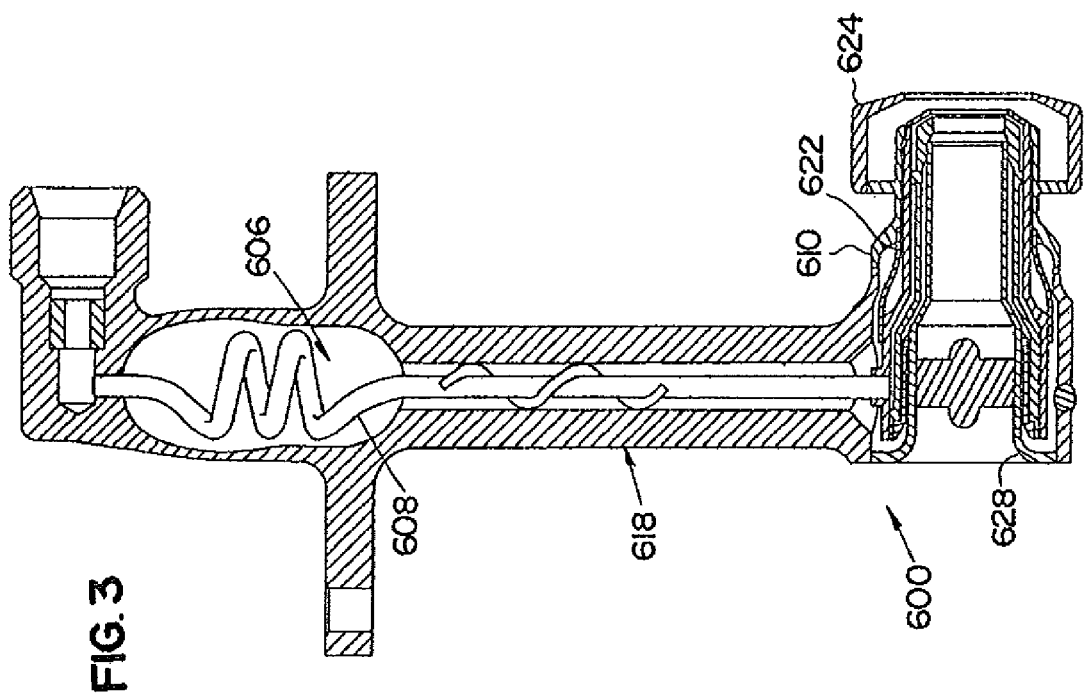

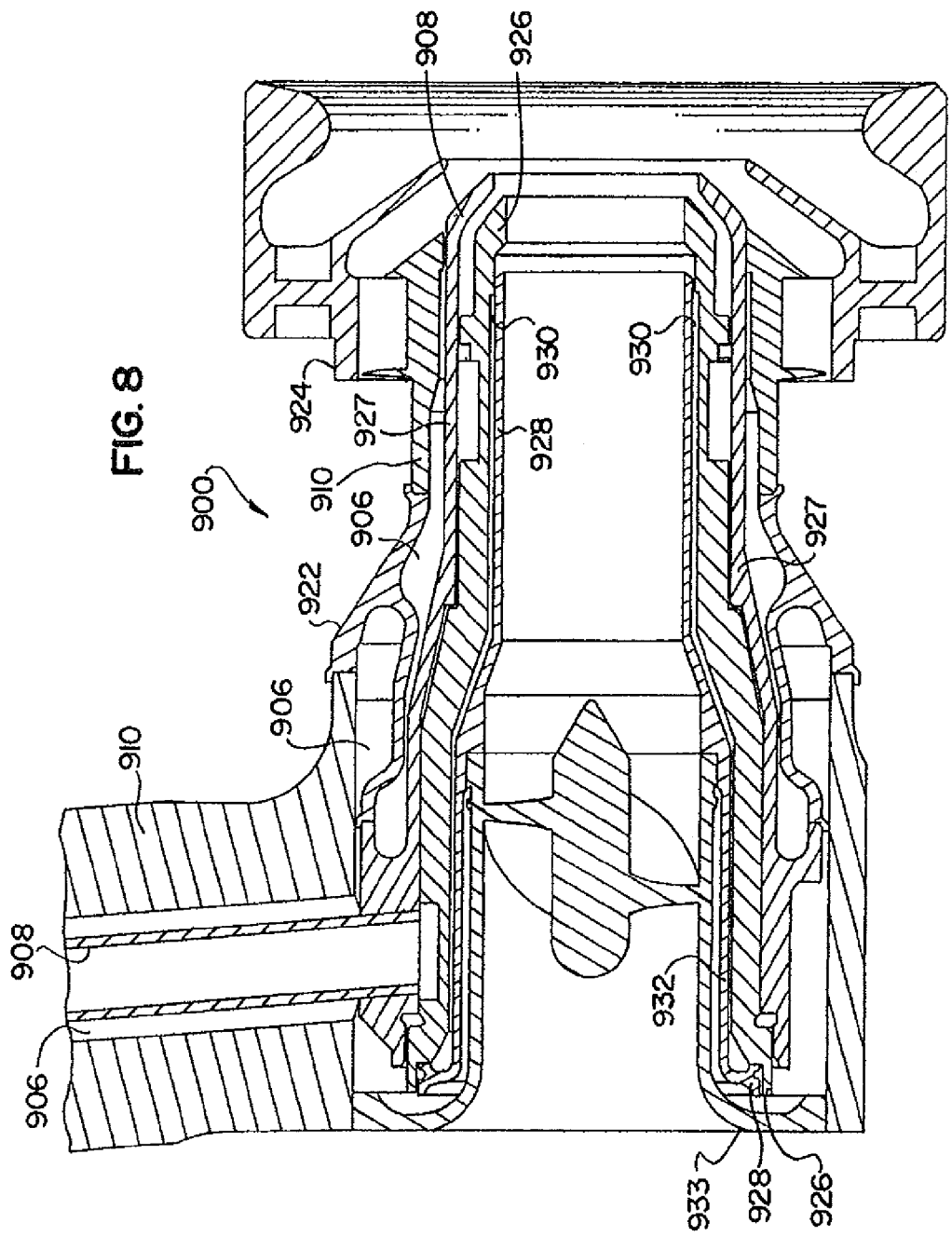

FLEXURE SEAL FOR FUEL INJECTION NOZZLE

CROSS-REFERENCE TO RELATED APPLICATION

This application is a continuation in part of U.S. patent application Ser. No. 12/212,272 filed Sep. 17, 2008, which claims benefit of priority to U.S. Provisional Patent Application Ser. No. 60/994,053 filed Sep. 17, 2007, each of which is incorporated by reference herein in its entirety.

BACKGROUND OF THE INVENTION

1. Field of the Invention

The present invention relates to injectors and nozzles for high temperature applications, and more particularly, to fuel injectors and nozzles for gas turbine engines used in aircraft.

2. Description of Related Art

A variety of devices and methods are known in the art for injecting fuel into gas turbine engines. Of such devices, many are directed to injecting fuel into combustors of gas turbine engines under high temperature conditions.

European Patent Application No. 1,811,229, which is incorporated by reference herein in its entirety, describes several aspects of fuel nozzles for gas turbine injectors. Fuel injectors for gas turbine engines on an aircraft direct fuel from a manifold to a combustion chamber of a combustor. The fuel injector typically has an inlet fitting connected to the manifold for receiving the fuel, a fuel nozzle located within the combustor for spraying fuel into the combustion chamber, and a housing stem extending between and fluidly interconnecting the inlet fitting and the fuel nozzle. The housing stem typically has a mounting flange for attachment to the casing of the combustor.

Fuel injectors are usually heat-shielded because of high operating temperatures arising from high temperature gas turbine compressor discharge air flowing around the housing stem and nozzle. The heat shielding prevents the fuel passing through the injector from breaking down into its constituent components (i.e., "coking"), which may occur when the wetted wall temperatures of a fuel passage exceed 400° F. The coke in the fuel passages of the fuel injector can build up to restrict fuel flow to the nozzle.

Heretofore, injectors have included annular stagnant air gaps as insulation between external walls, such as those in thermal contact with high temperature ambient conditions, and internal walls in thermal contact with the fuel. In order to accommodate differential expansion of the internal and external walls while minimizing thermally induced stresses, the walls heretofore have been anchored at one end and free at the other end for relative movement. If the downstream tip ends of the walls are left free for relative movement, even a close fitting sliding interface between the downstream tip ends can allow fuel to pass into the air gap formed between the walls. This can result in carbon being formed in the air gap, which carbon is not as good an insulator as air. In addition, the carbon may build up to a point where it blocks venting of the air gap to the stem, which can lead to an accumulation of fuel in the air gap. This can lead to diminished injector service life and may require frequent and costly cleaning of the fuel injector.

Such conventional methods and systems generally have been considered satisfactory for their intended purpose. However, there still remains a continued need in the art for a nozzle or fuel injector that allows for differential expansion while reducing or preventing fuel entry in the air gaps. The present invention provides a solution for these problems.

SUMMARY OF THE INVENTION

The purpose and advantages of the present invention will be set forth in and become apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes a fuel injector for a gas turbine engine. The fuel injector has an injector body including a feed arm with a nozzle body connected thereto. A fuel conduit fluidly connects a fuel inlet portion of the feed arm to a fuel circuit in the nozzle body to form a fuel path through the injector body. An outer feed arm wall is included outboard of the fuel conduit. A prefilmer within the nozzle body is operatively connected to the fuel conduit of the feed arm to define a portion of the fuel circuit in the nozzle body. The fuel conduit of the feed arm and the prefilmer of the nozzle body form portions of an interior wall of the injector body. An outer nozzle body wall is included outboard of the prefilmer. The outer nozzle body wall and outer feed arm wall form portions of an exterior wall of the injector body. A main insulative gap is defined between the interior and exterior walls of the injector body to thermally insulate the fuel path of the injector body from ambient conditions. A fuel swirler wall is disposed radially inward of the prefilmer, with a prefilmer chamber defined therebetween. An inner air swirler is disposed radially inward of a portion of the fuel swirler wall. An inner insulative gap is defined between the fuel swirler and the inner air swirler, wherein the inner insulative gap is in fluid communication with the main insulative gap. Flexible sealing means internal to the nozzle body isolate the inner insulative gap from any ambient fluid entering into the main insulative gap therethrough and provide relative axial and radial movement between the fuel swirler wall and the inner air swirler.

In one aspect, the flexible sealing means includes an annular flexure beam disposed in a gap between the fuel swirler wall and the inner air swirler, wherein the annular flexure beam is joined at a first end to the fuel swirler wall and is joined at a second end to the inner air swirler. It is also contemplated that the flexible sealing means can include a c-seal, o-ring, d-ring, e-ring, or any other suitable type seal disposed between the fuel swirler wall and the inner air swirler. It is further contemplated that the flexible sealing means can include a bellows structure disposed across the main insulative gap. Such a bellows structure can be disposed between the fuel conduit and a portion of the exterior wall surrounding the fuel conduit. The inner air swirler can include an upstream portion and a downstream portion joined together, the downstream portion being joined to the fuel swirler wall, with an upstream seal section of the downstream portion of the inner air swirler forming an annular flexure beam disposed between the upstream portion of the inner air swirler and the fuel swirler wall.

In another aspect, isolating means can be provided internal to the injector body for sealing a portion of the main insulative gap from ambient fluids and providing relative movement between the interior and exterior walls of the injector body. The isolating means can include a generally sigmoid flexure seal disposed across a portion of the main insulative gap between the exterior wall and the prefilmer. It is contemplated that at least a portion of the main insulative gap can contain a noble gas, vacuum, or other suitable insulative material. It is also contemplated that the main insulative gap can include stagnant air that is vented by an opening located in a region where fuel can not enter. A portion of the main insulative gap within the feed arm can be vented to engine compressor discharge air.

The invention also includes a nozzle including an inlet at an upstream end of the nozzle, a discharge outlet at a downstream end of the nozzle, and a fluid delivery passage extending between the inlet and the discharge outlet. An interior annular wall bounds one side of the fluid delivery passage along a length thereof. The internal annular wall is in heat transfer relation with fluid passing through the fuel delivery passage. An exterior annular wall is interposed between the interior annular wall and ambient conditions, wherein the exterior and interior walls have downstream tip ends that are adapted for relative longitudinal movement at an interface. An internal insulating gap is interposed between the interior and exterior walls to insulate the internal wall from ambient temperature conditions exterior to the nozzle. Flexible sealing means internal to the nozzle are included for isolating a portion of the insulating gap from any ambient fluid entering into the portion of the gap through the interface and for allowing axial and radial movement between the interior and exterior annular walls. The flexible sealing means includes a generally sigmoid shaped flexure seal disposed across the portion of the insulating gap, wherein the flexure seal is contained entirely within the insulating gap. The flexible sealing means can be formed as a separate component.

The nozzle can further include a fuel swirler wall disposed radially inward of a prefilmer portion of the interior annular wall, with a prefilmer chamber defined therebetween, and an inner air swirler disposed radially inward of a portion of the fuel swirler. The nozzle can further include an annular flexure beam disposed in a gap between the fuel swirler wall and the inner air swirler, the annular flexure beam being joined at a first end to the fuel swirler wall and being joined at a second end to the inner air swirler. It is also contemplated that the nozzle can further include an outer air swirler disposed radially outward from the interior annular wall. The outer air swirler can include one or more concentric sets of swirler vanes.

The flexure seal can join the outer air swirler to form a portion of the exterior annular wall. The flexure seal can be formed integral with at least one of the outer air swirler and a portion of the exterior annular wall. It is also contemplated that there can be a c-seal, or other suitable type of seal, disposed between the fuel swirler and the inner air swirler. A portion of the insulating gap can contain a noble gas. It is also contemplated that the main insulative gap can include stagnant air that is vented by an opening located in a region where fuel can not enter. The main insulative gap can be vented to compressor discharge air such that fuel cannot enter. The means for isolating can include a bellows structure disposed between the fluid delivery passage and a portion of the exterior annular wall surrounding the fluid delivery passage.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 2 is a cross-sectional side elevation view of a portion of another representative embodiment of a nozzle constructed in accordance with the present invention, showing an annular flexure beam between the fuel swirler and the inner air swirler;

FIG. 3 is a cross-sectional side elevation view of another representative embodiment of an injector constructed in accordance with the present invention, showing a flexure seal contained completely inside a gap formed between the interior and exterior annular walls;

FIG. 4 is an enlarged cross-sectional side elevation view of a portion of the injector of FIG. 3, showing the flexure seal inside a gap formed between the interior and exterior annular walls;

FIG. 8 is a cross-sectional side elevation view of another representative embodiment of a nozzle portion of a fuel injector constructed in accordance with the present invention, showing a two-part inner air swirler forming a flexure seal across the insulative gap between the inner air swirler and the fuel swirler.

DETAILED DESCRIPTION OF THE PREFERRED EMBODIMENTS

Figure 1:
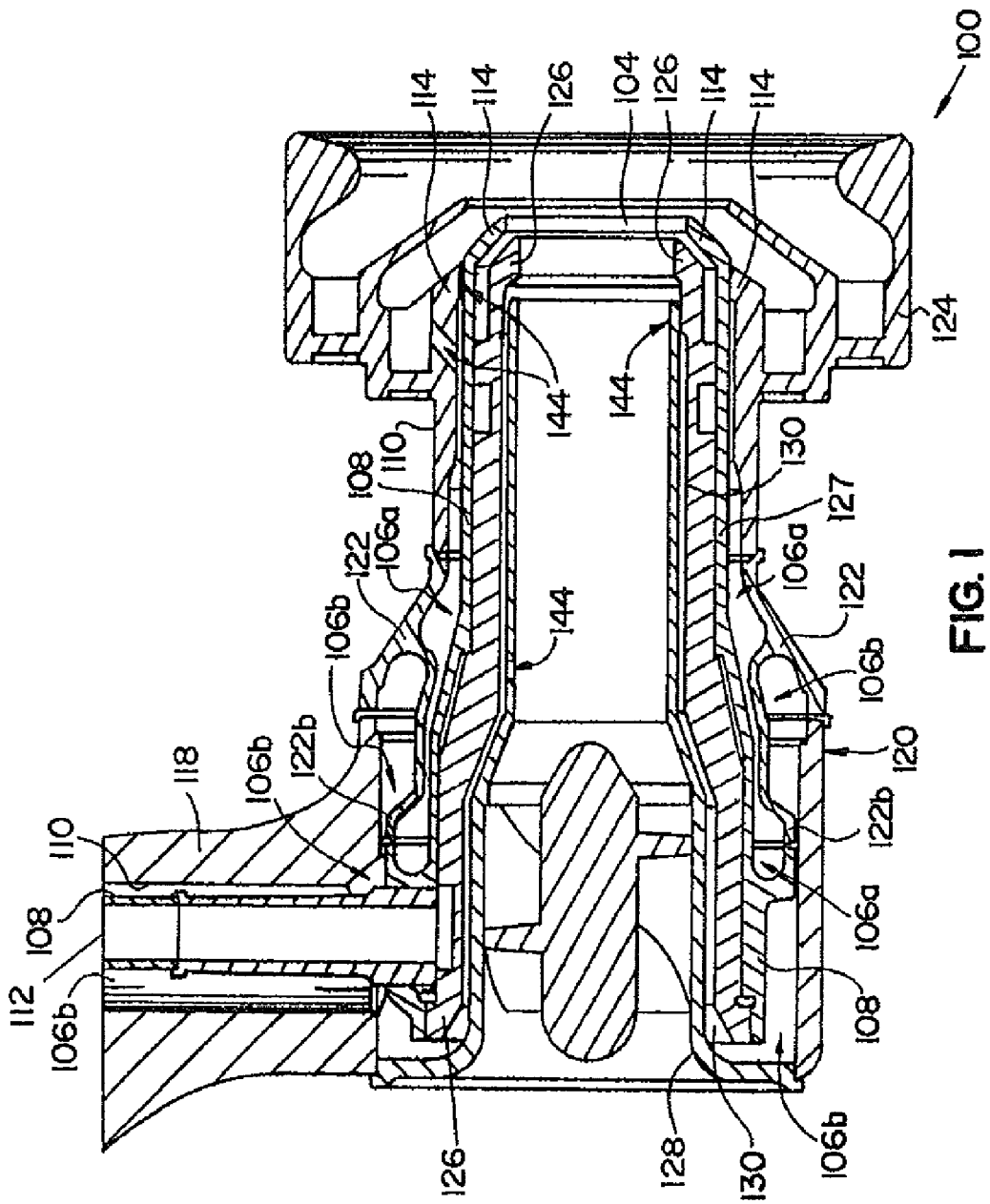
FIG. 1 is a cross-sectional side elevation view of a first representative embodiment of an injector constructed in accordance with the present invention, showing the cavities between the exterior annular wall and the interior annular wall, as well as between the fuel swirler and the inner air swirler.

Reference will now be made to the drawings wherein like reference numerals identify similar structural features or aspects of the subject invention. For purposes of explanation and illustration, and not limitation, a partial view of an exemplary embodiment of an injector in accordance with the invention is shown in FIG. 1 and is designated generally by reference character 100. Other embodiments of injectors and nozzles in accordance with the invention, or aspects thereof, are provided in FIGS. 2-8, as will be described. The devices and methods of the invention can be used in gas turbine engines, or in any other suitable application, for enhanced injector performance.

Figure 6:
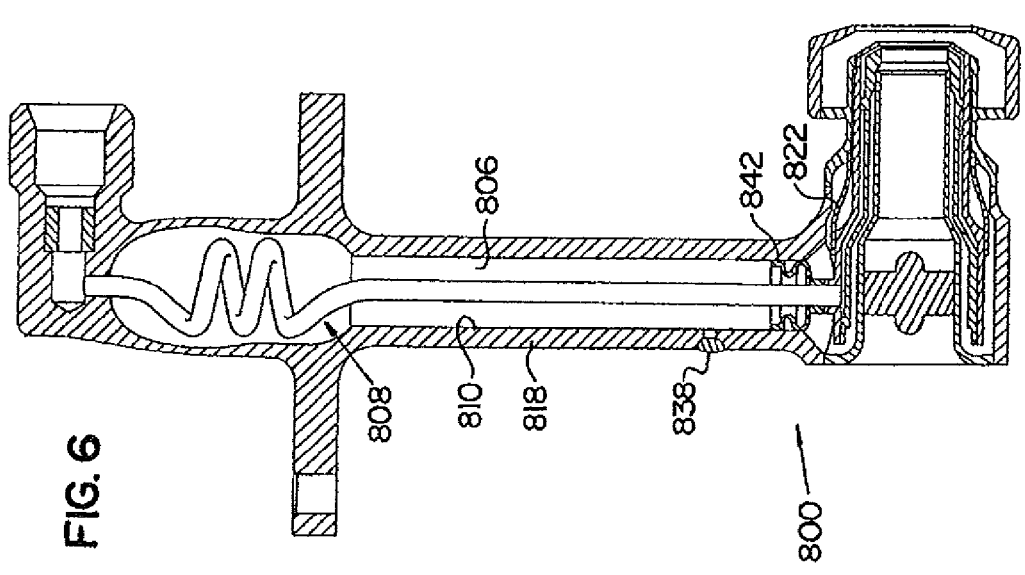
FIG. 6 is a cross-sectional side elevation view of another representative embodiment of an injector constructed in accordance with the present invention, showing a bellows structure between the fluid delivery passage and a portion of the exterior annular wall.

As shown in FIG. 1, injector 100 depends from a feed arm 118. An inlet, not shown in FIG. 1, but see, e.g., FIGS. 3 and 6, is provided at an upstream portion of injector 100. A discharge outlet 104 is provided at a downstream portion of injector 100. A fuel delivery passage 112 connects the inlet with discharge outlet 104, allowing for a flow of fuel through the injector 100.

An interior wall 108, including fuel conduit 112 within feed arm 118 and prefilmer 127 in nozzle body 120, bounds one side of fluid delivery passage 112. There is also an exterior wall 110, including the outer wall of feed arm 118 and outer air swirler 124, interposed between internal wall 108 and ambient conditions. An insulative gap 106 exists between walls 108, 110, portions of which are generally annular. This helps insulate interior fuel passage 112 from ambient conditions. Insulative gap 106 is important for reducing or preventing coking that can occur if the fuel reaches temperatures around 400° F. Coking inside the fuel passage could eventually choke the fuel flow if unchecked.

Relatively warm ambient compressor discharge gasses flowing around exterior wall 110 can cause thermal expansion, whereas the relatively cool fuel keeps interior wall 108 relatively cool, limiting thermal expansion. Additionally, walls 108, 110 need not have the same coefficient of thermal expansion. Thus in operating conditions there can be a significant difference in the thermal expansion of walls 108, 110. In order to reduce stress arising from the thermal gradients, walls 108 and 110 have downstream tip ends 114 that are moveable with respect to one another and form an interface that allows fluid to pass therebetween to gap 106. A variety of other structures, such as the coils shown in FIGS. 3 and 6, can also help accommodate relative thermal expansion between walls 108 and 110. Those skilled in the art will readily appreciate that fuel passage 112 could instead include portions that are wave shaped, convoluted, or of any other suitable configuration for accommodating thermal expansion without departing from the spirit and scope of the invention.

Gap 106 continues from feed arm 118 through nozzle portion 120 of injector 100. FIG. 1 shows gap 106 in nozzle body 120, where flexure seal 122 divides gap 106 into a downstream portion 106a and upstream portion 106b. Flexure seal 122 discourages ambient fluids including fuel from entering upstream gap 106b through the opening between wall tips 114. This keeps upstream gap 106b clear from fuel and thus prevents coking buildup therein. Flexure seal 122 is elongate and includes a portion generally sigmoid in shape, as shown in cross-section in FIG. 1. It can therefore flex to accommodate different amounts of thermal expansion between interior and exterior walls 108, 110. Those skilled in the art will readily appreciate that a variety of suitable shapes can be used in lieu of the sigmoid shape shown in FIG. 1 without departing from the spirit and scope of the invention. Flexure seal 122 forms a portion of outer wall 110, joining outer air cap 124 (which includes the outer air swirler) and feed arm 118 portions of outer wall 110. Another end 122b is joined to interior wall 108, to further extend the generally sigmoid cross-sectional shape of flexure seal 122. Flexure seal 122 can be joined to injector 100 by brazing, welding, fastening, or any other suitable joining method. Flexure seal 122 accommodates radial thermal expansion differences about the centerline of nozzle portion 120. Flexure seal 122 also accommodates thermal expansion differences in other directions, such as the direction along the centerline of feed arm 118, which can also be significant.

In further accordance with the invention, a fuel swirler wall 126 is located radially inward from prefilmer portion 127 of interior wall 108, with a fuel prefilming chamber defined therebetween. An inner air swirler 128 is disposed radially inward from fuel swirler wall 126 with an insulative gap 130 therebetween. In this manner, inner swirler 128 also acts as a heat shield insulating fuel in the prefilmer chamber from hot gasses flowing through inner swirler 128.

With continuing reference to FIG. 1, nozzle 100 includes vents 144, which allow for air in gaps 106/130 to freely expand and contract with changes in temperature. Vents 144 can be openings at diametrical clearances between components, such as interfaces between tip ends 114, or can be in the form of bores passing through single components such as inner air swirler 128 and outer wall 110. When injector 100 is not in operation, fuel can be drawn into vents 144 by capillary action, gravity, and/or suction caused by the contraction of cooling air in gaps 106/130, for example when the engine shuts down. Subsequently, if the fuel is heated upon operation of injector 100, coking can occur within gaps 106/130. However, flexure seal 122 has the advantage of discouraging fuel from passing through vents 144 into upstream portions of gap 106b.

FIG. 2 shows another exemplary embodiment of an injector 200, which includes interior and exterior annular walls 208, 210, flexure seal 222, outer air swirler 224, fuel swirler wall 226, prefilmer portion 227 of interior wall 208, and inner air swirler 228, much the same as described above with respect to injector 100. A gap 230a/b exists between inner air swirler 228 and fuel swirler wall 226. In order to discourage ambient fluids including fuel entering gap 230a/b, an annular flexure beam 232 separates gap 230a/b into upstream and downstream portions 230a and 230b, respectively. Flexure beam 232 is joined at one end to fuel swirler wall 226, and at its other end to inner air swirler 228. This configuration allows for relative thermal expansion differentials between walls 226, 228 while preventing coking in upstream gap 230a, which is contiguous with gap 206. Thus flexure beam 232 and flexure seal 222 working in conjunction can seal gaps 206/230 from fuel while still allowing for relative thermal expansion differences in the various parts of injector 200.

It is possible for gap 206 to be airtight. Gap 206 can contain a vacuum, which provides significant insulation between walls 208 and 210. It is also possible to fill gap 206 with air, which can also provide suitable insulation. Noble gasses, such as Argon, can also be used as an insulation gas in gap 206, with the advantage of superior heat shielding compared to air. Noble gasses also reduce oxidation of stainless steel, nickel, and other alloys commonly used in nozzle construction. A further advantage of using noble gasses is inflammability. Other insulating materials can also be used, such as fiber insulation, insulating powders, and insulative slurries. Those skilled in the art will readily appreciate that any suitable insulation material can be used in gap 206 without departing from the spirit and scope of the invention.

While gap 206 can be airtight, as discussed above, it is not necessary for gap 206 to be airtight. It is also contemplated that the main insulative gap can include stagnant air that is vented by an opening located in a region where fuel can not enter. For example, a vent into gap 206 can be included so as to allow venting of gap 206 with compressor discharge air such that fuel cannot enter gap 206.

While in various embodiments of flexure seals (e.g. 122, 222) have been shown as an individual component joined to other nozzle components, it is also possible for a flexure seal to be formed integrally with at least one other nozzle component. For example the flexure seal can be formed integrally with an outer air swirler, e.g. swirler 124. Those skilled in the art will readily appreciate how to form flexure seals integrally with one or more other nozzle parts without departing from the spirit and scope of the invention. It is also possible to include more than one fuel flow including valves for a main fuel line and a pilot fuel line. Insulative gaps in accordance with the invention can be used around each of many fuel lines, or to surround several fuel lines together.

FIG. 3 shows another exemplary embodiment of an injector 600. Injector 600 includes a single outer air swirler 624 and inner air swirler 628. A portion of outer air swirler 624 is joined to stem portion 618 to form exterior wall 610. Interior wall 608 is spaced apart from exterior wall 610 to form gap 606 much as described above. Flexure seal 622 is completely contained within gap 606 and forms no exterior surface of wall 610. As best shown in FIG. 4, one end of flexure seal 622 is joined to an inside surface of exterior wall 610 and the other end is joined to an outer surface of interior wall 608. A flexure beam 632 is also included, which operates in the same manner as flexure beam 232, described above. Welded aperture 638 is provided in exterior wall 610. Prior to welding aperture 638, gap 606 can be evacuated or filled with suitable insulating material, by any suitable process. The insulating material is then sealed in when aperture 638 is welded. For example, injector 600 could be introduced into a noble gas environment with aperture 638 open, allowing the gas to enter gap 606. Welding aperture 638 within the noble gas environment seals gap 606, which remains filled with the noble gas. It is also possible to seal insulating material in a gap without using aperture 638. For example, nozzles without aperture 638 can nonetheless have insulating material sealed in their respective gap by brazing, welding, mechanical sealing or packing of respective components. Those skilled in the art will readily recognize that any means of sealing insulating material inside nozzle gaps can be used without departing from the spirit and scope of the invention.

Figure 5:
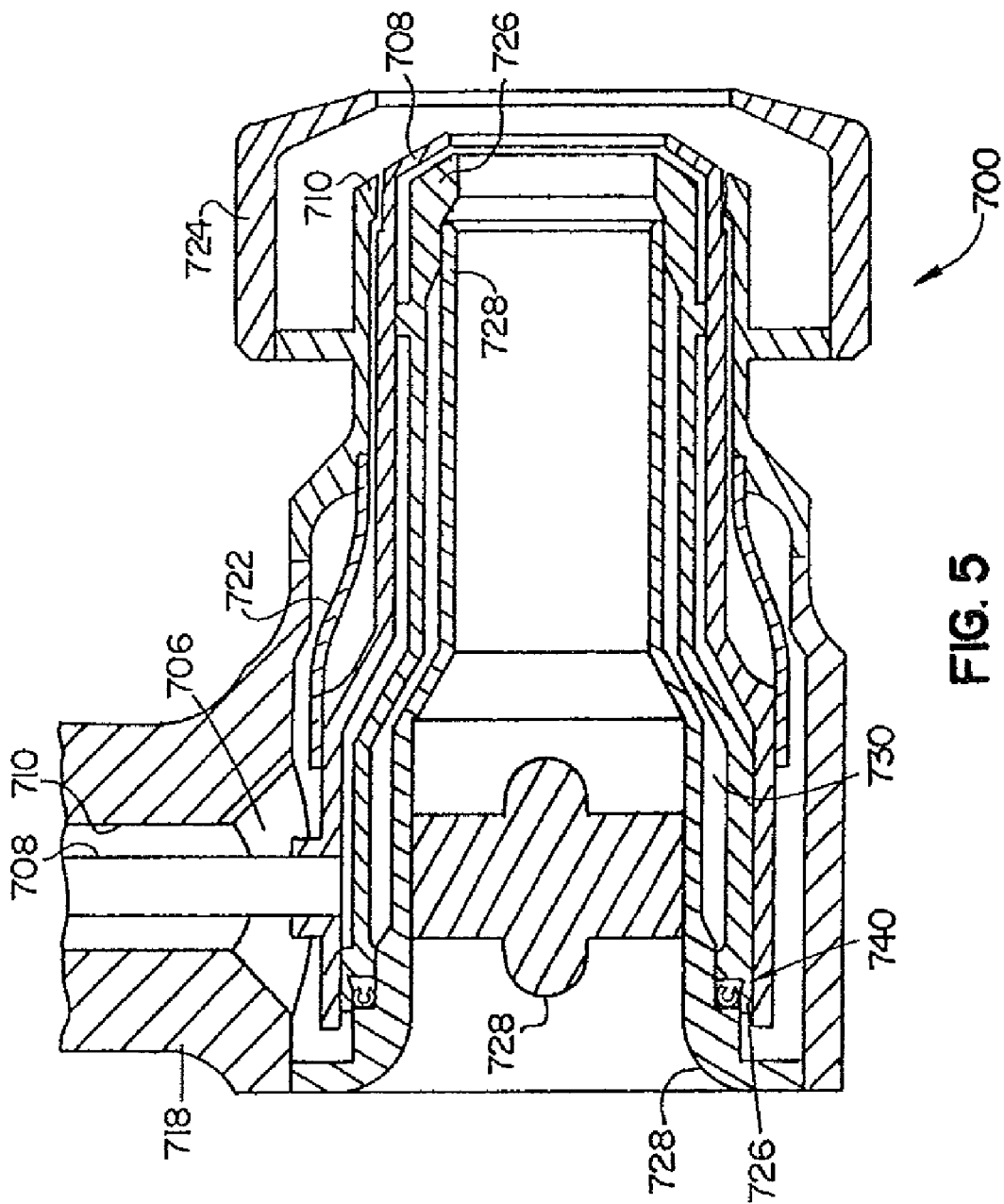
FIG. 5 is cross-sectional side elevation view of a portion of another representative embodiment of a nozzle constructed in accordance with the present invention, showing a c-seal between the fuel swirler and the inner air swirler.

FIG. 5 shows a nozzle portion of a further exemplary embodiment of an injector 700 in accordance with the present invention. Injector 700 includes interior and exterior walls 708, 710 with gap 706 sealed by flexure seal 722, much as described above. Injector 700 further includes outer air swirler 724, fuel swirler wall 726, and inner air swirler 728, as described above. In lieu of a flexure beam (e.g. 232/632) injector 700 includes a c-seal 740, which seals gap 730 in a similar manner by resiliently engaging between inner air swirler 728 and fuel swirler wall 726. In addition to c-seals, o-rings, e-rings, d-rings, or other suitable seals can also be used to seal gap 730 without departing from the spirit and scope of the invention.

It is possible to use c-seal 740 in conjunction with a noble gas insulator. For example, the inner air swirler 728 and c-seal 740 can be inserted into fuel swirler wall 726 while injector 700 is in an argon chamber. Inner air swirler 728 can then be welded to feed arm 718. Inner air swirler 728 and fuel swirler wall 726 compress c-seal 740, trapping the argon in gap 706.

Figure 7:
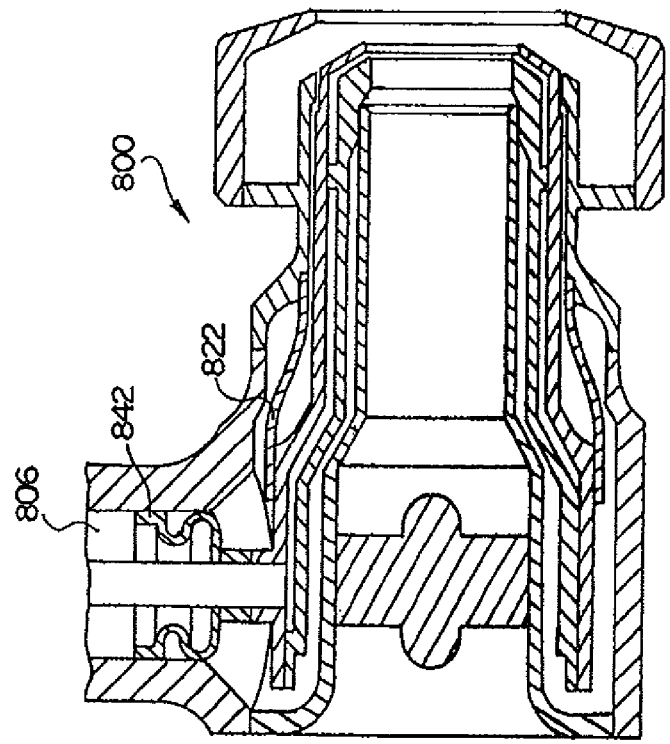
FIG. 7 is an enlarged cross-sectional side elevation view of a portion of the injector of FIG. 6, showing the bellows structure.

Yet another possible seal is shown in FIGS. 6 and 7 in conjunction with yet another embodiment of an injector 800. Injector 800 includes bellows 842, which cooperate with flexure seal 822 to seal gap 806 between walls 808, 810. A c-seal or other suitable seal can be used in lieu of bellows 842 in the same general location by making gap 806 narrower and otherwise configuring gap 806 for sealing by c-seal, or other suitable seal type. Injector 800 also includes a weld aperture 838 located on feed arm 818, which operates similar to weld aperture 638, described above. Those skilled in the art will readily appreciate that weld apertures are optional and can be located at any suitable location on a nozzle without departing from the spirit and scope of the invention.

An additional advantage of using a sealed insulating cavity in accordance with the invention is that the pressure gradient across the sealed cavity and the exterior of the inlet fitting of the injector can be reduced when compared to a vented air cavity. The pressure inside the sealed cavity will be determined by the pressure of the gas during welding and the temperature of the gas during operation. Therefore, stress on the inlet fitting can be reduced by matching the desired operating pressure with the pressure of the gas at the time of manufacture. Ideally, the combustor pressure would be accounted for across two areas, the nozzle tip and the inlet, with each accounting for half of the total combustor pressure. In this manner, the full combustor pressure will not act on the inlet fitting.

With reference now to FIG. 8, injector 900 includes inner wall 908, exterior wall 910, with gap 906 therebetween, sigmoid seal 922, air cap 924, prefilmer 927, and fuel swirler 926 much as described above. Gap 930 between fuel swirler 926 and the inner air swirler is sealed by a two-part inner air swirler wall with upstream section 933 joined to downstream section 928, which is in turn joined to fuel swirler 926. A seal portion 932 of downstream section 928 is located between upstream section 933 and fuel swirler 926. This two-part inner air swirler construction allows seal portion 932 of downstream section 928 of the inner air swirler to function much as flexure beams 232/632 described above. This allows the inner air swirler and upstream portion of the heat shield to be formed as one integral piece, thereby reducing the number of components and joints. Thus, while exemplary nozzles have been described above in conjunction with sigmoid flexure seals, flexure beams, c-seals, o-rings, etc., and bellows, those skilled in the art will readily appreciate that any combination of suitable seals can be used without departing from the spirit and scope of the invention.

The methods and systems of the present invention, as described above and shown in the drawings, provide for a nozzle with superior properties including discouraging or sealing fuel from entering insulation gaps. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A fuel injector for a gas turbine engine comprising:
 a) an injector body having a feed arm with a nozzle body connected thereto;
 b) a fuel conduit fluidly connecting a fuel inlet portion of the feed arm to a fuel circuit in the nozzle body to form a fuel path through the injector body;
 c) an outer feed arm wall outboard of the fuel conduit;
 d) a prefilmer within the nozzle body operatively connected to the fuel conduit of the feed arm to define a portion of the fuel circuit in the nozzle body, wherein the fuel conduit of the feed arm and the prefilmer of the nozzle body form portions of an interior wall of the injector body;
 e) an outer nozzle body wall outboard of the prefilmer, wherein the outer nozzle body wall and outer feed arm wall form portions of an exterior wall of the injector body;
 f) a main insulative gap defined between the interior and exterior walls of the injector body to thermally insulate the fuel path of the injector body from ambient conditions;
 g) a fuel swirler wall disposed radially inward of the prefilmer, with a prefilmer chamber defined therebetween;
 h) an inner air swirler disposed radially inward of a portion of the fuel swirler wall;
 i) an inner insulative gap defined between the fuel swirler and the inner air swirler, the inner insulative gap being in fluid communication with the main insulative gap; and
 j) a flexure seal for isolating the main insulative gap from ambient fluid entering into the main insulative gap therethrough and providing relative axial and radial movement between the interior and exterior walls of the injector body, the flexure seal forming part of the exterior wall of the injector body joining the outer feed arm wall to the outer nozzle body wall, wherein the flexure seal has a cross-section with a generally sigmoid portion that is mounted to the prefilmer.

2. A fuel injector as recited in claim 1, further comprising an annular flexure beam disposed in a gap between the fuel swirler wall and the inner air swirler, the annular flexure beam being joined at a first end to the fuel swirler wall and being joined at a second end to the inner air swirler.

3. A fuel injector as recited in claim 1, further comprising sealing means disposed between the fuel swirler wall and the inner air swirler and is selected from the group consisting of a c-seal, d-ring, e-ring, and o-ring.

4. A fuel injector as recited in claim 1, further comprising a bellows structure disposed across the main insulative gap.

5. A fuel injector as recited in claim 4, wherein the bellows structure is disposed between the fuel conduit and a portion of the exterior wall surrounding the fuel conduit.

6. A fuel injector as recited in claim 1, wherein the inner air swirler includes an upstream portion and a downstream portion joined together, the downstream portion being joined to the fuel swirler wall, and wherein an upstream seal section of the downstream portion of the inner air swirler forms an annular flexure beam disposed between the upstream portion of the inner air swirler and the fuel swirler wall.

7. A fuel injector as recited in claim 1, wherein at least a portion of the main insulative gap contains a noble gas.

8. A nozzle comprising:
a) an inlet at an upstream end of the nozzle;
b) a discharge outlet at a downstream end of the nozzle;
c) a fluid delivery passage extending between the inlet and the discharge outlet;
d) an interior annular wall bounding one side of the fluid delivery passage along a length thereof, wherein the internal annular wall is in heat transfer relation with fluid passing through the fuel delivery passage;
e) an exterior annular wall interposed between the interior annular wall and ambient conditions, wherein the exterior and interior walls have downstream tip ends that are adapted for relative longitudinal movement at an interface;
f) an internal insulating gap interposed between the interior and exterior walls to insulate the internal wall from ambient temperature conditions exterior to the nozzle; and
g) a generally sigmoid shaped flexure seal internal to the nozzle for isolating a portion of the insulating gap from ambient fluid entering into the portion of the gap through the interface and for allowing axial and radial movement between the interior and exterior annular walls, wherein the flexure seal is disposed across the portion of the insulating gap with an upstream end of the flexure seal mounted to the interior annular wall, with a downstream end of the flexure seal mounted to the exterior annular wall outboard of the interior annular wall, wherein the upstream end of the flexure seal is wider than the downstream end thereof, and wherein the flexure seal is contained entirely within the insulating gap.

9. A nozzle as recited in claim 8, further comprising a fuel swirler wall disposed radially inward of a prefilmer portion of the interior annular wall, with a prefilmer chamber defined therebetween, an inner air swirler disposed radially inward of a portion of the fuel swirler wall, and an annular flexure beam disposed in a gap between the fuel swirler wall and the inner air swirler, the annular flexure beam being joined at a first end to the fuel swirler wall and being joined at a second end to the inner air swirler.

10. A nozzle as recited in claim 9, wherein at least a portion of the insulating gap contains a noble gas.

11. A nozzle as recited in claim 8, further comprising a fuel swirler wall disposed radially inward of a prefilmer portion of the interior annular wall, with a prefilmer chamber defined therebetween, an inner air swirler disposed radially inward of a portion of the fuel swirler wall, and a c-seal disposed between the fuel swirler wall and the inner air swirler.

12. A nozzle as recited in claim 8, further comprising a fuel swirler wall disposed radially inward of a prefilmer portion of the interior annular wall, with a prefilmer chamber defined therebetween, an inner air swirler disposed radially inward of a portion of the fuel swirler wall, and a bellows structure disposed across the internal insulating gap.

13. A nozzle as recited in claim 8, further comprising an inner air swirler radially inward of a fuel swirler that is radially inward of the interior annular wall, wherein the inner air swirler includes an upstream portion and a downstream portion joined together, the downstream portion being joined to the fuel swirler wall.

14. A nozzle as recited in claim 13, wherein an upstream seal section of the downstream portion of the inner air swirler forms an annular flexure beam disposed between the upstream portion of the inner air swirler and the fuel swirler wall.

15. A fuel injector for a gas turbine engine comprising:
a) an injector body having a feed arm with a nozzle body connected thereto;
b) a fuel conduit fluidly connecting a fuel inlet portion of the feed arm to a fuel circuit in the nozzle body to form a fuel path through the injector body;
c) an outer feed arm wall outboard of the fuel conduit;
d) a prefilmer within the nozzle body operatively connected to the fuel conduit of the feed arm to define a portion of the fuel circuit in the nozzle body, wherein the fuel conduit of the feed arm and the prefilmer of the nozzle body form portions of an interior wall of the injector body;
e) an outer nozzle body wall outboard of the prefilmer, wherein the outer nozzle body wall and outer feed arm wall form portions of an exterior wall of the injector body;
f) a main insulative gap defined between the interior and exterior walls of the injector body to thermally insulate the fuel path of the injector body from ambient conditions;
h) a fuel swirler disposed radially inward of the prefilmer with a prefilming chamber defined between the fuel swirler and the prefilmer;
i) an inner air swirler disposed radially inward of the fuel swirler with an inner insulative gap defined between the inner air swirler and the fuel swirler, wherein the inner insulative gap is in fluid communication with the main insulative gap of the injector body; and
j) an annular flexure beam disposed in the inner insulative gap between the fuel swirler and the inner air swirler, wherein the annular flexure beam is mounted at a first end thereof to an upstream end of the fuel swirler, and wherein the flexure beam is mounted at a second end thereof to the inner air swirler.

16. A fuel injector as recited in claim 15, wherein a portion of the main insulative gap within the feed arm is vented to engine compressor discharge air.

* * * * *